Patented July 22, 1924.

1,501,975

UNITED STATES PATENT OFFICE.

ROBERT W. STREHLENERT, OF NOL, SWEDEN.

BUILDING MATERIAL AND METHOD OF MANUFACTURING THE SAME.

No Drawing. Application filed September 18, 1923. Serial No. 663,474.

*To all whom it may concern:*

Be it known that I, ROBERT WILHELM STREHLENERT, a subject of the King of Sweden, and residing at Nol, Sweden, have invented certain new and useful Improvements in Building Materials and Methods of Manufacturing the Same, of which the following is a specification.

The present invention relates to a method of manufacturing a material adapted to be used chiefly in the erection of buildings and which below is denominated "building stone" or "stone" only. The stone is manufactured of a mixture in which the chief components consist of clay and waste sulphite liquor or a substance analogous therewith and to which is added saw-dust, other wood cuttings, wood wool or the like. Granting that it is already known to manufacture a building material in which wood-dust, other waste wood or peat and waste sulphite liquor have constituted the main components and whereto possibly also has been added some clay, the mixture then obtained has, however, been of another nature than the one here in question and stones manufactured of such mixture have been of inferior quality as to strength and have readily absorbed water, while it has not been possible to give such stones the exact dimensions required and shrinkage and distortion always has occurred.

The mixture composed in accordance to this invention and in which the waste sulphite liquor or a substance analogous therewith forms the power of binding together the materials, is subjected to high pressure and drying in suitable moulds, when is formed a chemical combination, silicate of calcium being also then to some extent formed which also binds the added waste wood in the mixture. This last named substance contributes to increase the volume of the stone being manufactured as well as to highly increase its insulating power.

The mixing of the different substances may be carried out in a suitable mixing machine and when accomplished the total quantity of water in the mixture ought to be only so great that the mixture issuing from the machine is in the form of a granular mass, the quantity of water being besides so proportioned that no water will leave the mass when this latter is subjected to the pressure, because, if that should be the case, not only some liquor but also some clay would leave the mass together with the water, whereby the stone manufactured under such conditions would not be of the desired quality. This mass, which prior to being subjected to the pressure is dried so as to contain about 10% water, is slightly stamped together in the moulds which are proportioned in accordance with the desired shape the building stone has to obtain, and is then subjected to high pressure, say about 100 to 200 kg. per cm.², no water then leaving the mass. At subsequent drying in the air the remaining quantity of water will escape without the shape of the stones, however, thereby being changed. If desired the stones may easily be reinforced. Owing partly to the great strength the finished stone possesses and partly to the possibility of reinforcing the same, these stones may with advantage be joined to large blocks or supporting members in constructional work, as for instance beams or the like, ready to be placed in their positions in the building for which they have been constructed.

Stones manufactured according to this invention have proved to possess a compression strength exceeding 400 kg. per cm.² and to be perfectly homogeneous in the fracture. As to its nature the mass is like horn and may be worked by such tools, for instance drills, saws, etc., as are used in working metals.

In order that stones of the kind described may obtain the desired degree of hardness, may stand against high pressure and be practically insensible to moisture, the same are, when well dried in the air, subjected to a hardening process whereby they will be almost not hygroscopical. This process consists in a rapid heating during a few minutes to about 200° C. or thereabove, a reaction then taking place which penetrates the mass to a desired depth depending upon the time the stone is subjected to the heating and the temperature then used. The sulphite liquor is then partially decomposed and binds together the whole to an extremely hard mass which is utterly insensible to moisture.

The form of the stones manufactured according to this invention is, with regard to measures, characterized by great accuracy, the surfaces of the stones are extremely smooth and even, they do not get distorted or warped after being pressed, in consequence whereof it is an easy work to erect buildings of stones of this kind.

In the claims where the expression "wood cuttings" is employed I desire it to be understood that the same is intended to include wood dust or sawdust, waste wood, and of such forms as shavings.

Having now described my invention what I claim as new and desire to secure by Letters Patent is:

1. A method of manufacturing building stones of a mixture of clay, wood cuttings and waste sulphite liquor, characterized thereby, that these substances are mixed together with so small a quantity of water that the mass will be of a granular consistency, whereafter the mass under pressure is pressed in moulds to stones and then during a short period subjected to a rapid heating to about 200° C. or thereabove in order that the waste sulphite liquor may be partially decomposed and the stone hard and not hygroscopical.

2. Building stones manufactured in accordance with the method stated in claim 1.

In witness whereof I have hereunto set my hand in presence of two witnesses.

ROBERT W. STREHLENERT.

Witnesses:
M. CRISTENSEN,
FR. FETTSTRÖM